United States Patent [19]
Udagawa

[11] Patent Number: 5,653,451
[45] Date of Patent: Aug. 5, 1997

[54] METAL GASKET WITH INDEPENDENT AND ECCENTRIC SUPPORT BEAD

[75] Inventor: Tsunekazu Udagawa, Ichikawa, Japan

[73] Assignee: Ishikawa Gasket Co., Ltd., Tokyo, Japan

[21] Appl. No.: 576,292

[22] Filed: Dec. 21, 1995

[51] Int. Cl.$^6$ ................................................. F16J 15/08
[52] U.S. Cl. ........................................ 277/180; 277/235 B
[58] Field of Search ................................ 277/180, 233, 277/235 B

[56] References Cited

U.S. PATENT DOCUMENTS

| | | | |
|---|---|---|---|
| 4,759,556 | 7/1988 | Udagawa | 277/235 B |
| 4,861,046 | 8/1989 | Udagwa | 277/235 B |
| 5,078,413 | 1/1992 | Miyaoh | 277/235 B |
| 5,199,723 | 4/1993 | Udagawa | 277/235 B |
| 5,240,261 | 8/1993 | Udagawa et al. | 277/235 B |
| 5,269,541 | 12/1993 | Inamura | 277/235 B |
| 5,344,165 | 9/1994 | Miyaoh et al. | 277/235 B |
| 5,427,389 | 6/1995 | Ishikawa et al. | 277/235 B |

FOREIGN PATENT DOCUMENTS

| | | | |
|---|---|---|---|
| 229036 | 12/1984 | Japan | 277/235 B |
| 267350 | 11/1990 | Japan | 277/235 B |

Primary Examiner—Scott Cummings
Attorney, Agent, or Firm—Kanesaka & Takeuchi

[57] ABSTRACT

A metal gasket for an internal combustion engine is installed between two engine parts. The metal gasket is formed of at least one metal plate extending substantially throughout an entire area of the engine to be sealed. The metal plate includes at least one bolt hole, a fluid hole situated near the bolt hole, a sealing device for surrounding the fluid hole to seal therearound, and a support bead situated around the sealing device without surrounding the bolt hole. The support bead is deviated from the fluid hole to balance surface pressure around the fluid hole when the engine parts are tightened. In case the gasket is formed of a plurality of metal plates, the sealing device and the support bead are formed on the different plates.

17 Claims, 2 Drawing Sheets

5,653,451

METAL GASKET WITH INDEPENDENT AND ECCENTRIC SUPPORT BEAD

BACKGROUND OF THE INVENTION AND RELATED ART STATEMENT

The present invention relates to a metal gasket with a support bead for providing a balanced surface pressure around a fluid hole of an internal combustion engine.

In the internal combustion engine, bolts are arranged around the cylinder bores to securely seal therearound. Other holes, such as water holes, oil holes and so on, are simply situated near the cylinder bores, and are sealed by the surface pressures formed by the bolts arranged around the cylinder bores.

In a cylinder head gasket, therefore, when the bolts are tightened, the surface pressures formed around the cylinder bores are generally equal, and the portions around the cylinder bores are securely sealed by the surface pressures formed by the tightened bolts. However, the areas around other holes, such as water hole, oil holes and so on, are not equally compressed.

For example, in case a water hole with a sealing bead is situated near a bolt hole, where a surface pressure is mainly formed by one bolt passing through the bolt hole, when the bolt is tightened, the sealing bead around the water hole does not receive an equal tightening pressure. Generally, a bolt side of the bead is tightened strongly, while the portion of the bead away from the bolt is not tightened strongly.

In order to securely seal around the fluid hole, such as the water hole and oil hole, it is preferable to form a surface pressure on the sealing means as equal as possible. Also, it is preferable to support the engine part at an edge portion of the gasket so that the gasket does not vibrate at the edge portion.

In U.S. Pat. No. 5,078,413, two beads are formed around a cylinder bore to securely seal around the cylinder bore. However, the beads do not form an equal surface pressure around the cylinder bore.

In U.S. Pat. No. 4,834,399, a bead is formed around the edge of the gasket. The bead supports the edges of the gasket properly, but a local surface pressure is not supported.

In view of the foregoing, the present invention has been made, and an object of the present invention is to provide a metal gasket, which can provide a surface pressure for sealing means around a fluid hole as equal as possible.

Another object of the invention is to provide a metal gasket as stated above, which can seal securely around the fluid hole.

A further object of the invention is to provide a metal gasket as stated above, wherein the equal surface pressure is formed regardless the rigidity of an engine part.

A still further object of the invention is to provide a metal gasket as stated above, which can support a local pressure applied thereto.

Other objects and advantages of the invention will be apparent from the following description of the invention.

SUMMARY OF THE INVENTION

A metal gasket of the invention is installed between two engine parts of an internal combustion engine. The gasket is formed of at least one metal plate extending substantially throughout an entire area of the engine. The metal plate includes at least one bolt hole, a fluid hole situated near the bolt hole, sealing means for surrounding the fluid hole to seal therearound, and a support bead situated around the sealing means. The support bead does not surround the bolt hole, and is arranged to be deviated from the fluid hole. Namely, the support bead is not concentrically arranged relative to the fluid hole nor the sealing means.

In the invention, the support bead is situated around the fluid hole to balance the surface pressure therearound when the engine parts are tightened by the bolts passing through the bolt holes. Namely, with reference to the surface pressures applied around the fluid hole, a side of the support bead near the bolt hole is located close to or away from the sealing means. Therefore, the sealing means can be substantially equally tightened to securely seal around the fluid hole. The support bead also helps sealing around the fluid hole.

The support bead has longitudinal side portions and lateral side portions. The length between the longitudinal side portions is greater than the length between the lateral side portions, and is oriented generally in a direction away from the bolt hole. Namely, the support bead is oriented in a direction where the applied surface pressure is low.

Preferably, the metal gasket of the invention is a cylinder head gasket situated under a cylinder head. In the invention, the location of the support bead is changed based on the rigidity of the cylinder head. Namely, a close portion of the support bead near the sealing means is located near the bolt hole when the rigidity of the cylinder head is high, and the close portion is located at a portion away from the bolt hole when the rigidity of the cylinder head is low.

In case the rigidity of the cylinder head is high, when the gasket is tightened, the cylinder head does not substantially bend. Namely, the portion away from the bolt hole is sufficiently compressed, and also, the portion near the bolt hole receives high tightening pressure. Therefore, the close portion is located near the bolt hole.

On the other hand, in case the rigidity of the cylinder head is low, the cylinder head slightly bend when the engine is tightened. In this case, if the close portion is formed near the bolt hole, the close portion and the sealing means may be compressed properly, but the portion opposite to the close portion can not receive sufficient surface pressure. Therefore, the close portion is formed at a portion away from the bolt hole.

Preferably, the surface pressure of the bead formed at the close portion is made higher than a surface pressure formed at the side portion opposite to the close portion. In this respect, the surface pressure on the support bead can be easily controlled. The bead at the close portion may have a width shorter than a width at the portion opposite to the close portion. The height of the bead at the close portion may be made higher than that at the opposite portion.

The metal gasket may be formed of a plurality of metal plates. In this case, the sealing means and the support bead may be formed on the different plates. Also, the spring constant of the sealing means may be different from that of the support bead. In case the plates for the sealing means and the support bead are different, the spring constant can be easily changed by, for example, changing hardness and thickness of the plates.

DETAILED DESCRIPTION OF PREFERRED EMBODIMENTS

Figure 1:
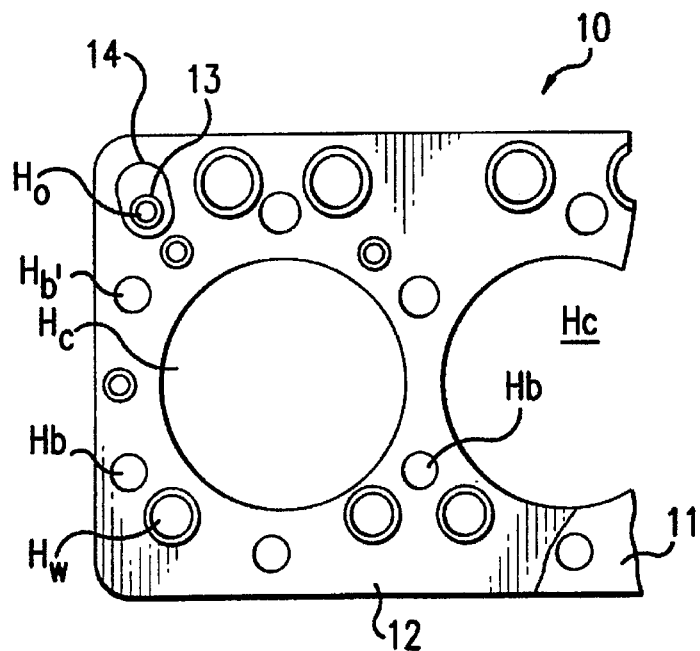
FIG. 1 is a plan view of a part of a first embodiment of a cylinder head gasket of the present invention.
Figure 2:
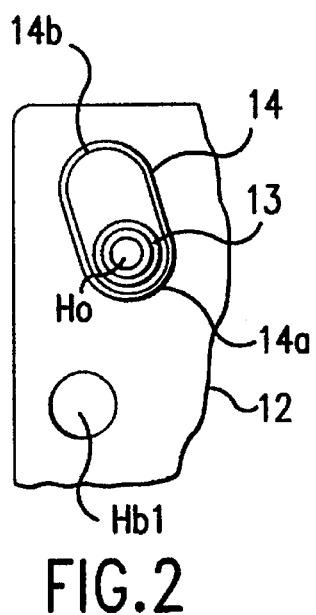
FIG. 2 is an enlarged plan view of a part of the cylinder head gasket as shown in FIG. 1.

Referring to FIGS. 1 and 2, a cylinder head gasket 10 of a first embodiment of the invention is shown. The cylinder head gasket 10 includes a plurality of cylinder bores Hc, water holes Hw, bolt holes Hb, Hb1, oil holes Ho and so on, as in the conventional gasket. The feature of the invention is directed to the sealing and supporting mechanism around the oil hole Ho in relation to the bolt hole Hb1. Therefore, the sealing mechanisms for the cylinder bores Hc and other holes are not explained. Any sealing mechanisms may be used for the cylinder bores and other holes.

The gasket 10 is formed of an upper metal plate 11, and a lower metal plate 12 situated under the plate 11, which extend throughout the entire area of the gasket to be sealed between a cylinder head and a cylinder block (both not shown). The upper and lower plates 11, 12 include the cylinder bores Hc, water holes Hw and so on, respectively. In addition, the lower plate 12 includes a sealing bead 13 and a support bead 14 around the oil hole Ho.

The sealing bead 13 and the support bead 14 completely surround the oil hole Ho and project toward the upper plate 11. The sealing bead 13 is concentrically arranged relative to the oil hole Ho, but the support bead 14 is located outside the sealing bead 13 eccentrically or to be deviated relative to the oil hole Ho and the sealing bead 13. Namely, the support bead 14 extends from the bolt hole Hb1 toward the corner of the plate 12, or an area where the surface pressure is weak.

In the embodiment, the cylinder head has sufficient rigidity. Namely, when the cylinder head is tightened to the cylinder block, the cylinder head does not substantially project upwardly in the middle thereof. Therefore, the gasket can be relatively equally compressed between the cylinder head and the cylinder block.

In this engine, however, when a bolt (not shown) passing through the bolt hole Hb1 is tightened, a portion near the bolt hole Hb1 is compressed slightly strongly relative to a portion away from the bolt hole Hb1. Since the cylinder head has the sufficient rigidity, the support bead 14 is arranged such that a close or front portion 14a is located near the sealing bead 13, and a rear portion 14b is located near the corner of the gasket 10.

Since the front portion 14a close to the bolt hole Hb1 receives relatively high tightening pressure, such high pressure is supported by the front portion 14a in addition to the sealing bead 13. On the other hand, the rear portion away from the bolt hole Hb1 where high pressure is not applied is supported by the rear portion 14b. Since the cylinder head has sufficient rigidity, the rear portion 14b can be compressed. Therefore, when the gasket 10 is tightened, the sealing bead 13 can be substantially equally compressed.

In the invention, since the corner portion of the gasket has the rear portion 14b of the bead 14, even if the engine is severely vibrated, the corner portion of the gasket is well supported by the support bead 14. Therefore, creep relaxation of the sealing bead 13 is prevented.

Figure 3:
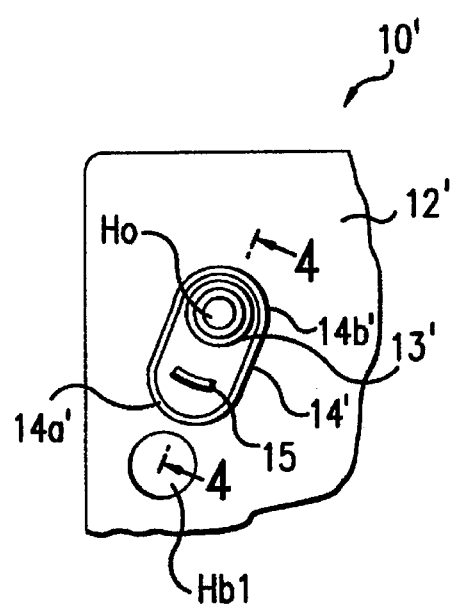
FIG. 3 is an enlarged plan view, similar to FIG. 2, of a second embodiment of a metal plate of the invention.
Figure 4:
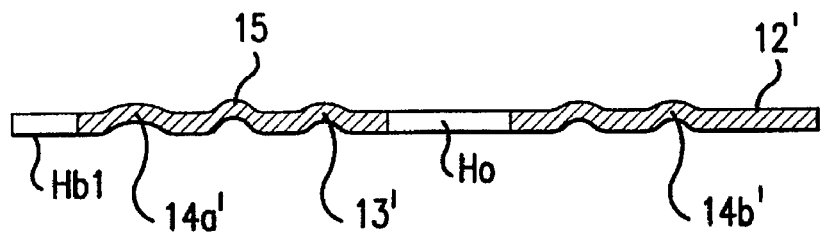
FIG. 4 is an enlarged section view of the metal plate taken along line 4—4 in FIG. 3.

FIGS. 3 and 4 show a lower plate 12' of a cylinder head gasket 10', which forms a second embodiment of the invention. The plate 12' is assembled with an upper plate (not shown) to constitute the cylinder head gasket 10', as in the gasket 10. The gasket 10' is used for a cylinder head which does not have high rigidity. Namely, when the cylinder head is tightened relative to the cylinder block, the cylinder head is generally bent along the cylinder block and the gasket. Therefore, the portions away from the bolt holes can not be compressed so strongly.

The lower plate 12' includes a sealing bead 13' concentrically arranged around the oil hole Ho, a support bead 14' eccentrically arranged relative to the oil hole Ho, and an auxiliary bead 15 between the sealing bead 13' and the support bead 14'. The support bead 14' extends from the oil hole Ho toward the bolt hole Hb1. A front portion 14a' is located near the bolt hole Hb1 away from the oil hole Ho, while a rear portion 14b' is located near the oil hole Ho away from the bolt hole Hb1. The auxiliary bead 15 supports a portion between the sealing bead 13' and the support bead 14'.

As explained above, the gasket 10' is used for the cylinder head which does not have high rigidity. Since the cylinder head does not have high rigidity, when the cylinder head is tightened to the cylinder block, although tightened portions can provide high surface pressure, non-tightened portions away from the tightened portions can not provide high surface pressure. In this case, if a bead providing high surface pressure is located near a bolt hole, a portion away from the bolt hole can not be properly compressed or provide high surface pressure for sealing.

Therefore, in the invention, the front portion 14a' is located near the bolt hole Hb1, and the rear portion 14b' is located near the sealing bead 13'. Since the front portion 14a' is only located near the bolt hole, the front portion 14a' can be relatively easily compressed. Therefore, the rear portion 14b' and the sealing bead 13' situated away from the bolt hole Hb1 receive high tightening pressure. Accordingly, the sealing bead 13' around the oil hole Ho can be properly compressed for sealing.

In the gasket 10', it is preferable that the front portion 14a' can be compressed easily. Therefore, the width of the bead at the front portion 14a' is made wider than the rest of the bead. On the other hand, the height of the front portion 14a' may be made lower than the rest of the bead for controlling the surface pressure of the bead.

In the gasket 10', the surface pressure can be increased as a whole to securely seal around the oil hole Ho.

Figure 5:
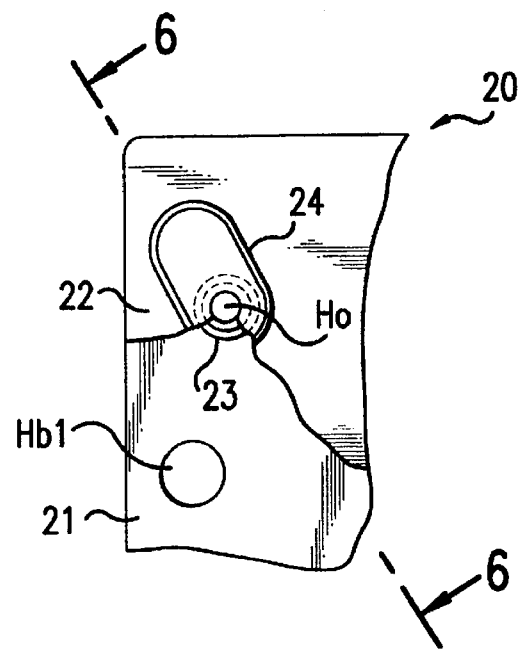
FIG. 5 is an enlarged plan view, similar to FIG. 2, of a third embodiment of a metal laminate gasket of the invention.
Figure 6:
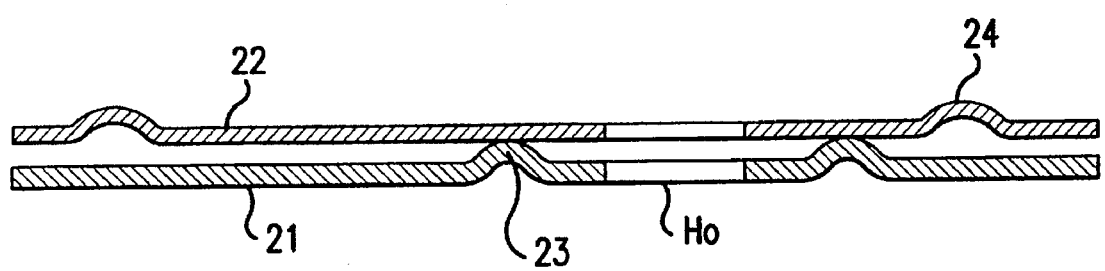
FIG. 6 is an enlarged section view taken along line 6—6 in FIG. 5.

FIGS. 5 and 6 show a third embodiment 20 of the invention, which is formed of a lower plate 21 and an upper plate 22, similar to the gasket 10. The gasket 20 is used for the cylinder head having high rigidity and includes a sealing bead and a support bead, as in the gasket 10. However, the sealing bead 23 is formed on the lower plate 21, and the support bead 24 is formed on the upper plate 22.

In the gasket 20, the lower plate 21 is thicker than the upper plate 22. Therefore, the sealing bead 23 can provide surface pressure greater than that of the support bead 24. The rest of the structure of the gasket 20 is the same as the gasket 10. The gasket 20 can securely seal around the oil hole Ho and operates as in the gasket 10.

In the gasket 20, the lower plate 21 is thicker than the upper plate 22. In order to change the spring constant of the plates, however, the hardness of the plates may be changed, and the width and height of the beads may be changed as well.

In the gasket of the invention, the support bead is formed around the sealing bead for the fluid hole, so that the balance of the sealing bead is adjusted to securely seal around the fluid hole. The fluid hole can be securely sealed as well.

While the invention has been explained with reference to the specific embodiments of the invention, the explanation is illustrative and the invention is limited only by the appended claims.

What is claimed is:

1. A metal gasket for an internal combustion engine to be installed between two engine parts, comprising:

a metal plate extending substantially throughout an entire area of the engine to be sealed for constituting the metal gasket, said metal plate including at least one bolt hole for allowing a bolt to pass therethrough, a fluid hole situated near the bolt hole, sealing means surrounding the fluid hole to seal therearound, and a support bead situated around the sealing means without surrounding the bolt hole, said support bead being formed independently and separately from the sealing means and arranged to be deviated eccentrically from the fluid hole and the sealing means to provide substantially equal surface pressure on the sealing means around the fluid hole when the engine parts are tightened by the bolt passing through the bolt hole.

2. A metal gasket according to claim 1, wherein said support bead has longitudinal side portions and lateral side portions, a length between the longitudinal side portions being greater than a length between the lateral side portions and being oriented generally in a direction away from the bolt hole.

3. A metal gasket according to claim 2, wherein said support bead is arranged relative to the sealing means such that one of the longitudinal side portions is situated close to the sealing means to form a close portion of the bead relative to the sealing means.

4. A metal gasket according to claim 3, wherein the metal gasket is a cylinder head gasket situated under a cylinder head with a rigidity, said close portion being located near the bolt hole when the rigidity is high where the cylinder head does not substantially bend when the engine is tightened.

5. A metal gasket according to claim 4, wherein a surface pressure of the bead formed at the close portion is higher than a surface pressure formed at the longitudinal side portion opposite to the close portion.

6. A metal gasket according to claim 5, wherein the bead at the close portion has a width shorter than a width at the portion opposite to the close portion.

7. A metal gasket according to claim 4, wherein said sealing means is a bead concentrically surrounding the fluid hole.

8. A metal gasket according to claim 3, wherein said metal plate further includes an auxiliary bead situated in a space between the sealing means and one of the longitudinal side portions situated at a side opposite to the close portion.

9. A metal laminate gasket for an internal combustion engine to be installed between two engine parts, comprising:

a first and second metal plates for constituting the metal laminate gasket, each of said first and second metal plates including at least one bolt hole for allowing a bolt to pass therethrough, and a fluid hole situated near the bolt hole, sealing means surrounding the fluid hole to seal therearound, said sealing means being formed on one of the first and second metal plates, and a support bead situated around the sealing means without surrounding the bolt hole, said support bead being formed on the other of the first and second metal plates independently and separately from the sealing means and being arranged to be deviated eccentrically from the fluid hole and the sealing means to provide substantially equal surface pressure on the sealing means around the fluid hole when the engine parts are tightened by the bolt passing through the bolt holes.

10. A metal laminate gasket according to claim 9, wherein said support bead has longitudinal side portions and lateral side portions, a length between the longitudinal side portions being greater than a length between the lateral side portions and being oriented generally in a direction away from the bolt hole of the plate where the support bead is formed.

11. A metal laminate gasket according to claim 10, wherein said sealing means is a sealing bead concentrically surrounding the fluid hole, and said support bead is arranged relative to the sealing bead such that one of the longitudinal side portions is situated close to the sealing bead to form a close portion of the support bead relative to the sealing bead.

12. A metal laminate gasket according to claim 11, wherein the metal gasket is a cylinder head gasket situated under a cylinder head with a rigidity, said close portion being located near the bolt hole when the rigidity is high where the cylinder head does not substantially bend when the engine is tightened.

13. A metal laminate gasket according to claim 12, wherein said sealing bead has a spring constant greater than that of the support bead.

14. A metal gasket according to claim 3, wherein said metal gasket is a cylinder head gasket situated under a cylinder head with a rigidity, said close portion being located at a portion away from the bolt hole when the rigidity is low where the cylinder head slightly bends when the engine is tightened.

15. A metal gasket according to claim 14, wherein said sealing means is a bead concentrically surrounding the fluid hole.

16. A metal laminate gasket according to claim 11, wherein said metal laminate gasket is a cylinder head gasket situated under a cylinder head with a rigidity, said close portion being located at a portion away from the bolt hole when the rigidity is low where the cylinder head slightly bends when the engine is tightened.

17. A metal laminate gasket according to claim 16, wherein said sealing bead has a spring constant greater than that of the support bead.

* * * * *